United States Patent [19]
Argoudelis et al.

[11] 3,821,367
[45] June 28, 1974

[54] ANTIBIOTICS EM-2, EM-3 AND EM-4 AND PROCESS FOR PRODUCING SAME

[75] Inventors: Alexander D. Argoudelis, Portage; LeRoy E. Johnson, Kalamazoo Twp., Kalamazoo County, both of Mich.

[73] Assignee: The Upjohn Company, Kalamazoo, Mich.

[22] Filed: Oct. 24, 1972

[21] Appl. No.: 300,433

[52] U.S. Cl.................... 424/119, 424/120, 195/80
[51] Int. Cl............................................. A61k 21/00
[58] Field of Search ............... 424/119, 120; 195/80

[56] References Cited
UNITED STATES PATENTS 3,626,055   12/1971   Higashide et al. ................. 424/120
3,697,649   10/1972   Reimann ............................ 424/120

Primary Examiner—Jerome D. Goldberg
Attorney, Agent, or Firm—Roman Saliwanchik

[57] ABSTRACT

New antibiotics, EM-2 (U-40588), EM-3 (U-40589), and EM-4 (U-40590), produced by the controlled fermentation of a strain of the known microorganism Emericellopsis microspora in an aqueous nutrient medium to which propylproline is added. These antibiotics are primarily active against Gram-positive bacteria and can be used in various environments to eradicate or control such bacteria.

9 Claims, 7 Drawing Figures

ANTIBIOTICS EM-2, EM-3 AND EM-4 AND PROCESS FOR PRODUCING SAME

BRIEF SUMMARY OF THE INVENTION

The novel compounds of the invention, EM-2, EM-3, and EM-4 are obtained by culturing *Emericellopsis microspora* strain 333, NRRL 5648, in an aqueous nutrient medium to which propylproline, e.g., 4'-trans-n-propyl-L-proline is added. These compounds are neutral compounds and have the property of adversely affecting the growth of Gram-positive bacteria, for example, *Staphylococcus aureus*, *Streptococcus hemolyticus*, *Streptococcus faecalis*, *Bacillus subtilis*, *Diplococcus pneumoniae*, and *Sarcina lutea*; they also demonstrate some Gram-negative activity and antiprotozoan activity. Accordingly, these antibiotics can be used alone or in combination with other antibiotic agents to prevent the growth of or reduce the number of bacteria, as disclosed above, in various environments.

DETAILED DESCRIPTION OF THE INVENTION CHEMICAL AND PHYSICAL PROPERTIES OF EM-2

1. Elemental Analysis:

Calc'd. for $C_{91}H_{146}N_{18}O_{26}$

C, 57.29; H, 7.66; N, 13.22; O, 21.83.

Found: C, 57.47; H, 7.70; N, 12.99; O, 21,87 (by difference).

2. Melting Point: 261.4° C.
3. Specific Rotation: $[\alpha]_D^{25} = +5°$ (c, 1.0, methanol)
4. Ultraviolet Absorption Spectrum:

In methanol:

| λ max (mμ) | a |
|---|---|
| 216(sh) | 24.02 |
| 269(sl.sh) | 2.67 |
| 273 | 2.81 |
| 281 | 2.97 |
| 289 | 2.62 |

5. Potentiometric Titration:

No titratable group was found when an EM-2 preparation was titrated in 75 percent aqueous ethanol with either sodium hydroxide or hydrochloric acid as titrants.

6. Solubilities:

Antibiotic EM-2 is soluble in dimethylformamide, dimethylsulfoxide and lower alcohols (one to four carbon atoms, inclusive). It is less soluble in chlorinated hydrocarbon solvents and ethyl acetate. It is rather insoluble in acetone and ether, and completely insoluble in saturated hydrocarbon solvents.

7. Aminoacid Composition:

A preparation of antiobiotic EM-2 was hydrolyzed with acid under standard conditions used for aminoacid analysis and the hydrolysate was analyzed for aminoacid content. Results are presented in Table A, infra.

Figure 1:
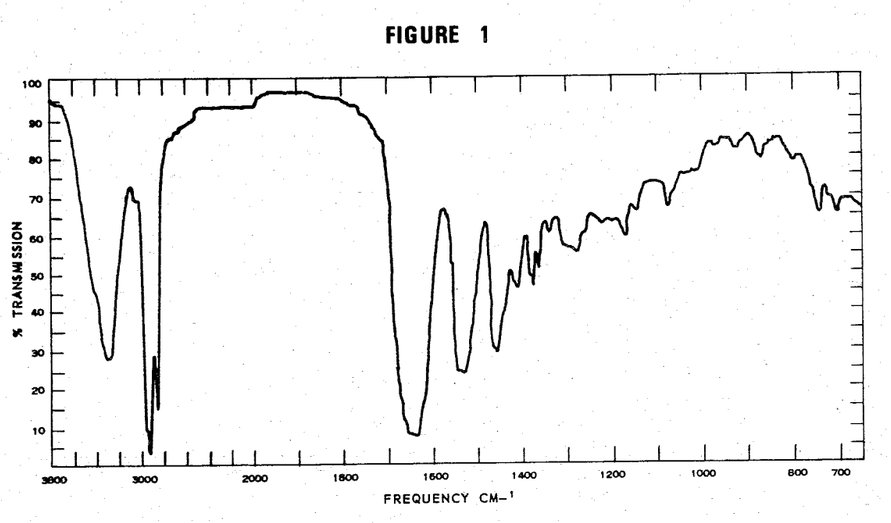

8. Infrared Absorption Spectra:

Infrared absorption spectrum of antibiotic EM-2 suspended in a mineral oil mull is reproduced in FIG. 1 of the drawing. Antibiotic EM-2 shows peaks at the following wave lengths expressed in reciprocal centimeters:

| Band Frequency (cm⁻¹) | Intensity | Band Frequency (cm⁻¹) | Intensity |
|---|---|---|---|
| 3400 | S | 2860 (oil) | S |
| 3292 | S | 1650 | S |
| 3060 | W | 1636 | S |
| 2960 (oil) | S | 1538 | S |
| 2928 (oil) | S | 1530 | S |
| 1455 | S | 1166 | M |
| 1415 | S | 1145 | M |
| 1410 | M | 1075 | M |
| 1378 | M | 1006 | M |
| 1375 | M | 967 | W |
| 1360 | M | 922 | W |
| 1337 | M | 867 | W |
| 1300 | M | 800 | W |
| 1280 | M | 740 | M |
| 1225 | M | 700 | M |
| 1200 | M | | |

Following is a tabulation of the infrared absorption spectrum wave lengths where the compound is pressed into a KBr pellet.

| Band Frequency (cm⁻¹) | Intensity | Band Frequency (cm⁻¹) | Intensity |
|---|---|---|---|
| 3420 | S | 1362 | M |
| 3320 | S | 1337 | M |
| 3060 | W | 1282 | M |
| 2965 | M | 1170 | M |
| 2935 | M | 1147 | M |
| 2875 | M | 1075 | M |
| 1645 | S | 1035 | W |
| 1538 | S | 1015 | W |
| 1530 | S | 965 | W |
| 1464 | M | 873 | W |
| 1455 | M | 800 | W |
| 1408 | M | 740 | M |
| 1380 | M | 700 | M |

Infrared band intensities, throughout this disclosure, are indicated as "S," "M," and "W," respectively, and are approximated in terms of the backgrounds in the vicinity of the bands. An "S" band is of the same order of intensity as the strongest in the spectrum; "M" bands are between one-third and two-thirds as intense as the strongest band; and, "W" bands are less than one-third as intense as the strongest band. These estimates are made on the basis of a percent transmission scale. "sh" denotes a shoulder.

CHEMICAL AND PHYSICAL PROPERTIES OF EM-3

1. Elemental Analysis:

Calc'd for $C_{68}H_{109}N_{13}O_{19}$:

C, 57.83; H, 7.73; N, 12.89; O, 21.55.

Found: C, 58.46; H, 7.78; N, 13.27; O, 21.49 (by difference).

2. Melting Point: 256.9° C.
3. Specific Rotation: $[\alpha]_D^{25} = +12°$ (c, 1.0, methanol)

4. Ultraviolet Absorption Spectrum:

In methanol:

| λ max (mμ) | a |
|---|---|
| 243(sl.sh) | 0.48 |
| 253 | 0.43 |
| 257 | 0.46 |
| 261(sh) | 0.43 |
| 264 | 0.44 |
| 267 | 0.41 |

5. Potentiometric Titration:

No titratable group was found when an EM-3 preparation was titrated in 72 percent aqueous ethanol with either sodium hydroxide or hydrochloric acid as titrants.

6. Solubilities:

Antibiotic EM-3 has the same solubility characteristics as antibiotic EM-2, supra.

7. Aminoacid Composition:

A preparation of antibiotic EM-3 was analyzed for aminoacid composition as disclosed above for antibiotic EM-2. Results are presented in Table A, infra.

Figure 2:
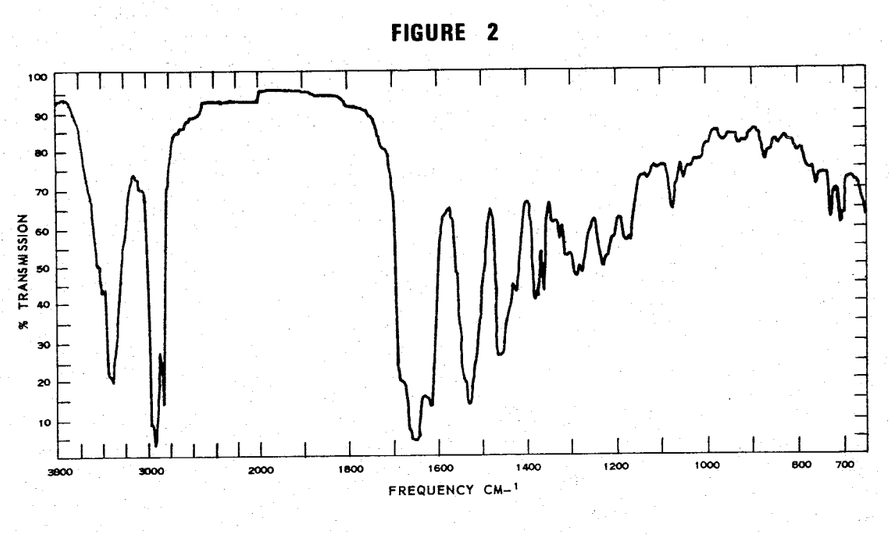

8. Infrared Absorption Spectra:

Infrared absorption spectrum of antibiotic EM-3 suspended in a mineral oil mull is reproduced in FIG. 2 of the drawing. Antibiotic EM-3 shows peaks at the following wave lengths expressed in reciprocal centimeters:

| Band Frequency (cm$^{-1}$) | Intensity | Band Frequency (cm$^{-1}$) | Intensity |
|---|---|---|---|
| 3430 | M | 1380 | M |
| 3395 | M | 1373 | M |
| 3325 | S | 1360 | M |
| 3315 | S | 1324 | M |
| 3060 | W | 1310 | M |
| 2960 (oil) | S | 1285 | M |
| 2920 (oil) | S | 1273 | M |
| 2855 (oil) | S | 1226 | M |
| 1680 | S | 1217 | M |
| 1651 | S | 1205 | M |
| 1622 | S | 1178 | M |
| 1613 | S | 1165 | M |
| 1537 | S | 1130 | W |
| 1530 | S | 1072 | W |
| 1460 | S | 1047 | W |
| 1422 | M | 1035 | W |
| 1018 | W | 840 | W |
| 1010 | W | 798 | W |
| 992 | W | 775 | W |
| 967 | W | 755 | W |
| 925 | W | 723 | M |
| 910 | W | 703 | M |
| 870 | W | 695 | M |
| 857 | W | | |

Following is a tabulation of the infrared absorption spectrum wavelengths where the compound is pressed into a KBr pellet.

| Band Frequency (cm$^{-1}$) | Intensity | Band Frequency (cm$^{-1}$) | Intensity |
|---|---|---|---|
| 3400 | S | 1417 | M |
| 3310 | S | 1384 | M |
| 3060 | M | 1367 | M |
| 3025 | M | 1330 | W |
| 2980 | M | 1286 | M |
| 2960 | M | 1217 | M |
| 2930 | M | 1172 | M |
| 2870 | M | 1125 | W |
| 1647 | S | 1076 | W |
| 1620 (sh) | S | 965 | W |
| 1540 | S | 925 | W |
| 1532 | S | 875 | W |
| 1465 | M | 797 | W |
| 1452 | M | 745 | W |
| 1435 | M | 700 | M |

CHEMICAL AND PHYSICAL PROPERTIES OF EM-4

1. Elemental Analysis:

Calc'd for $C_{81}H_{127}N_{17}O_{22}$:
C, 57.55; H, 7.52; N, 14.09; O, 20.84.
Found: C, 57.26; H, 7.45; N, 14.22; O, 21.08 (by difference).

2. Melting Point: 239.8° C.

3. Specific Rotation: $[\alpha]_D^{25} = +13.5°$ (c, 1.0, methanol)

4. Ultraviolet Absorption Spectrum:

In methanol:

| λ max (mμ) | a |
|---|---|
| 247(sh) | 0.26 |
| 252 | 0.24 |
| 257 | 0.26 |
| 261(sh) | — |
| 264 | 0.26 |
| 267 | 0.15 |

5. Solubilities:

Antibiotic EM-4 has the same solubility characteristics as antibiotic EM-2, supra.

6. Aminoacid Composition:

A preparation of antibiotic EM-4 was analyzed for aminoacid composition as disclosed above for antibiotic EM-2. Results are presented in Table A, infra.

Figure 3:
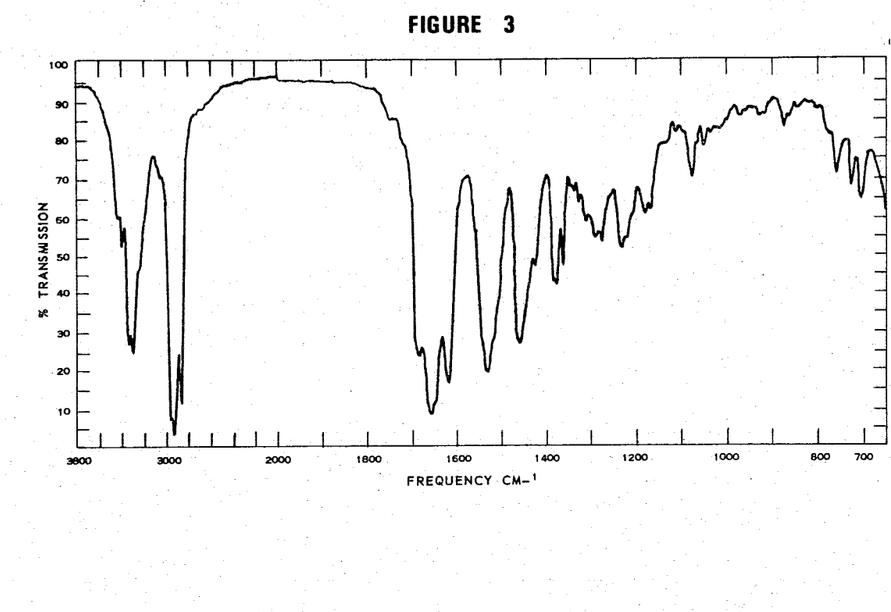

7. Infrared Absorption Spectra:

Infrared absorption spectrum of antibiotic EM-4 suspended in a mineral oil mull is reproduced in FIG. 3 of the drawing. Antibiotic EM-4 shows peaks at the following wave length expressed in reciprocal centimeters:

| Band Frequency (cm$^{-1}$) | Intensity | Band Frequency (cm$^{-1}$) | Intensity |
|---|---|---|---|
| 3420 | M | 1272 | M |
| 3390 | M | 1231 | M |
| 3330 | S | 1218(sh) | M |
| 3290 | S | 1177 | M |
| 2950(oil) | S | 1166 | M |
| 2920(oil) | S | 1135 | W |
| 2850(oil) | S | 1115 | W |
| 1750 | W | 1077 | W |
| 1690 | S | 1052 | W |
| 1660 | S | 1037 | W |
| 1620 | S | 1025 | W |
| 1535 | S | 972 | W |
| 1460 | S | 930 | W |
| 1427 | M | 915 | W |
| 1387 | M | 875 | W |
| 1380 | M | 862 | W |
| 1365 | M | 835 | W |
| 1348 | W | 805 | W |
| 1335 | W | 759 | W |
| 1330 | M | 727 | W |
| 1315 | M | 707 | M |
| 1297 | M | | |

Following is a tabulation of the infrared absorption spectrum wave lengths where the compound is pressed into a KBr pellet.

| Band Frequency (cm$^{-1}$) | Intensity | Band Frequency (cm$^{-1}$) | Intensity |
|---|---|---|---|
| 3400(sh) | S | 3060 | W |
| 3320 | S | 3020 | W |
| 2980 | M | 1361 | M |
| 2960 | M | 1330 | W |
| 2930 | M | 1280 | M |
| 2870 | W | 1220 | M |
| 1648 | S | 1170 | M |
| 1620 | S | 1077 | W |
| 1558 | M | 1028 | W |
| 1533 | S | 970 | W |

-Continued

| Band Frequency (cm⁻¹) | Intensity | Band Frequency (cm⁻¹) | Intensity |
|---|---|---|---|
| 1465 | M | 925 | W |
| 1452 | M | 874 | W |
| 1435 | M | 745 | W |
| 1413 | M | 697 | M |
| 1377 | M | | |

Following Tables A and B are additional characterizations of the antibiotics of the subject invention. Table A gives the aminoacid composition of the antibiotics and also compares them with the well-known antibiotic antiamoebin. Table B gives the antibacterial spectrum of the antibiotics of the subject invention and compares them with the antibiotic antiamoebin. This antibacterial spectrum was determined in a standard two-fold broth dilution test in Brain Heart Infusion broth wherein a final dilution of a fully grown culture in Brain Heart Infusion of 1/40,000 is made. Test organisms requiring blood are cultured in this, but the final antibiotic test is made in the absence of blood, since it has been found that adequate growth is obtained without it. Incubation is unshaken at 37° C. End points are read at 20 hours. Brain Heart Infusion broth (supplied by Difco Laboratories, Detroit, Mich., United States of America) has the following composition:

| | |
|---|---|
| Calf brains, infusion from | 200 gm. |
| Beef heart, infusion from | 250 gm. |
| Bacto proteose-peptone, Difco | 10 gm. |
| Bacto-Dextrose, Difco | 1 gm. |
| Sodium chloride | 5 gm. |
| Disodium phosphate | 2.5 gm. |
| Water | 1000 ml. |

The antibiotics of the subject invention also show antiprotozoal activity. The growth inhibition of the protozoa (O. danica and C. fasciculata) was determined by two-fold dilution end points in a medium consisting of:

| | |
|---|---|
| Glucose | 10gm/l |
| Bacto Proteose-peptone No. 3 (Difco) | 10gm/l |
| Yeastolate (Difco) | 1gm/l |

The protozoa were grown at 26° C. for 48 hours, diluted to a final concentration of 1:1,000; and the dilution tubes then incubated at 26° C. for 48 hours and end points read. The results are as follows:

| Protozoa | EM-2 | EM-3 | EM-4 |
|---|---|---|---|
| Ochromonas danica | 50mcg/ml* | 200mcg/ml** | 200mcg/ml** |
| Crithidia fasciculata | 50mcg/ml* | 200mcg/ml** | 200mcg/ml** |
| Tetrahymena pyriformis | 50mcg/ml* | >200mcg/ml** | 200mcg/ml** |

*Concentration which inhibited the growth of the protozoa.
**Concentration which partially inhibited the growth of the protozoa.

The infrared spectra and the presence of aminoacids in the antibiotic molecules of the subject invention show that these antibiotics belong to the "polypeptide" families. Extensive search showed the three antibiotics to be similar to antiamoebin [Hindustan Antibiotics Bulletin, 10, 287 (1968)] and stilbellin [J. Antibiotics, 24, 67 (1970)]. Antiamoebin and stilbellin have been reported to have the same aminoacid composition and appear to be identical to each other. Antibiotics EM-2, EM-3 and EM-4 have different aminoacid composi-

TABLE A

Aminoacid Composition of EM-2, EM-3, EM-4 and Antiamoebin

| | EM-2 | | EM-3 | | EM-4 | | Antiamoebin | |
|---|---|---|---|---|---|---|---|---|
| Aminoacid | Wt (%) | μmoles per mg | Wt (%) | μmoles per mg | Wt (%) | μmoles per mg | Wt (%) | μmoles per mg |
| Lysine | 3.18 | 0.221 | — | — | — | — | — | — |
| Hydroxyproline | 12.53 | 0.972 | 16.92 | 1.220 | 15.24 | 1.230 | 12.07 | 0.920 |
| Threonine | 5.01 | 0.427 | — | — | — | — | — | — |
| Glutamic | 13.39 | 0.925 | 8.65 | 0.555 | 8.32 | 0.598 | 7.02 | 0.477 |
| Proline | 6.67 | 0.589 | — | — | — | — | 6.03 | 0.524 |
| Glycine | — | — | 5.11 | 0.643 | 4.55 | 0.640 | 3.69 | 0.491 |
| Alanine | — | — | 4.43 | 0.470 | 0.43 | 0.051 | 1.46 | 0.164 |
| α-Aminoisobutyric acid | 3.44 | 0.346 | 2.91 | 0.272 | 5.84 | 0.611 | 4.82 | 0.477 |
| Valine | 1.78 | 0.154 | 7.47 | 0.602 | 7.08 | 0.639 | 1.97 | 0.168 |
| Isoleucine | 11.60 | 0.899 | — | — | — | — | — | — |
| Leucine | 7.02 | 0.544 | 8.03 | 0.578 | 7.68 | 0.619 | 7.27 | 0.544 |
| Phenylalanine | — | — | 9.64 | 0.551 | 10.03 | 0.642 | 8.64 | 0.523 |

TABLE B

ANTIBACTERIAL SPECTRUM OF ANTIBIOTICS EM-2, EM-3, EM-4 AND ANTIAMOEBIN

Minimum Inhibitory Concentration (mcg/ml)

| Test Organism | EM-2 mcg/ml | EM-3 mcg/ml | EM-4 mcg/ml | Antiamoebin mcg/ml |
|---|---|---|---|---|
| S. aureus UC 76 | 4 | 31 | 31 | 62 |
| S. aureus 552 | 8 | 31 | 62 | 125 |
| S. hemolyticus 152* | 2 | 16 | 31 | 62 |
| S. faecalis 3235 | 8 | 62 | 62 | 125 |
| E. coli 51 | >500 | >250 | 500 | 500 |
| P. vulgaris 93 | >500 | >250 | 500 | 500 |
| K. pneumoniae 57 | >500 | >250 | 500 | 500 |
| S. schottmuelleri 126 | 500 | >250 | 500 | 500 |
| Ps. aeruginosa 95 | 500 | >250 | 500 | 500 |
| B. subtilis 564 | 8 | 31 | 31 | 31 |
| D. pneumoniae 41* | 2 | 31 | 62 | 125 |
| s. lutea 130 | 2 | 8 | 16 | 31 |

Figure 4:
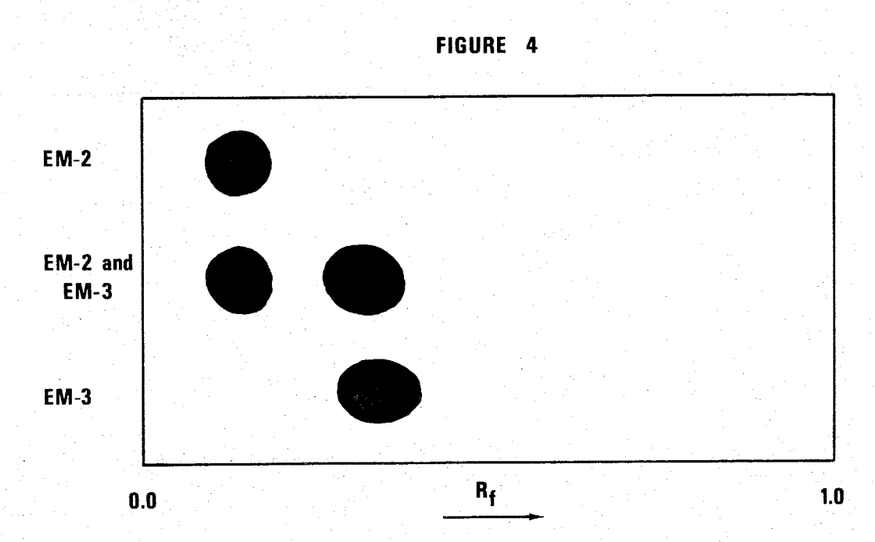
Figure 5:
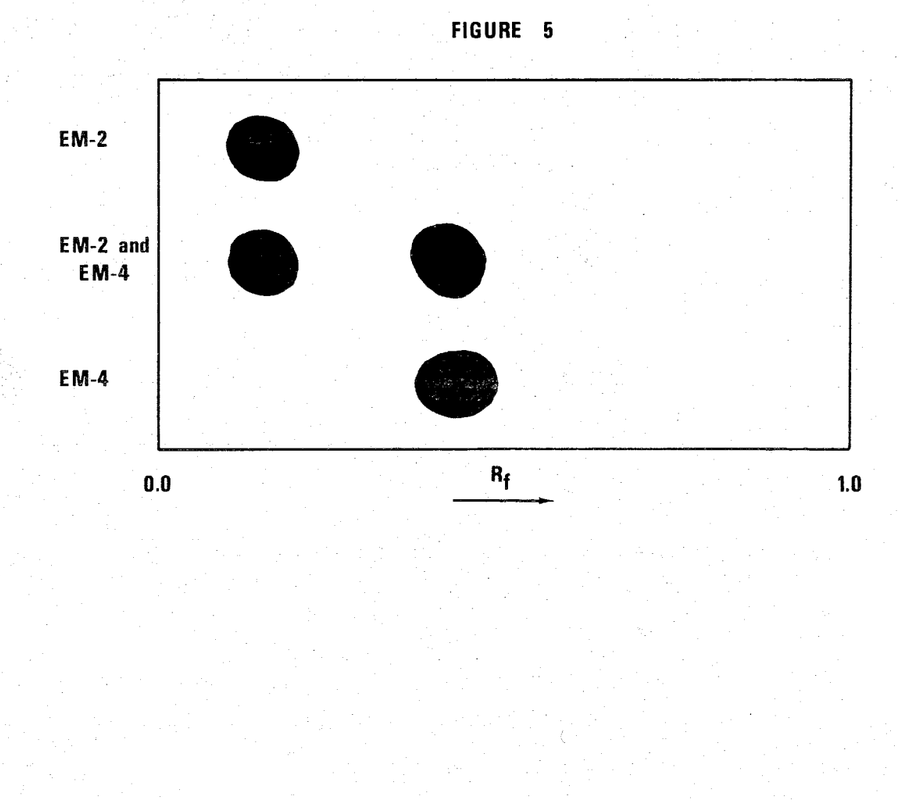
Figure 6:
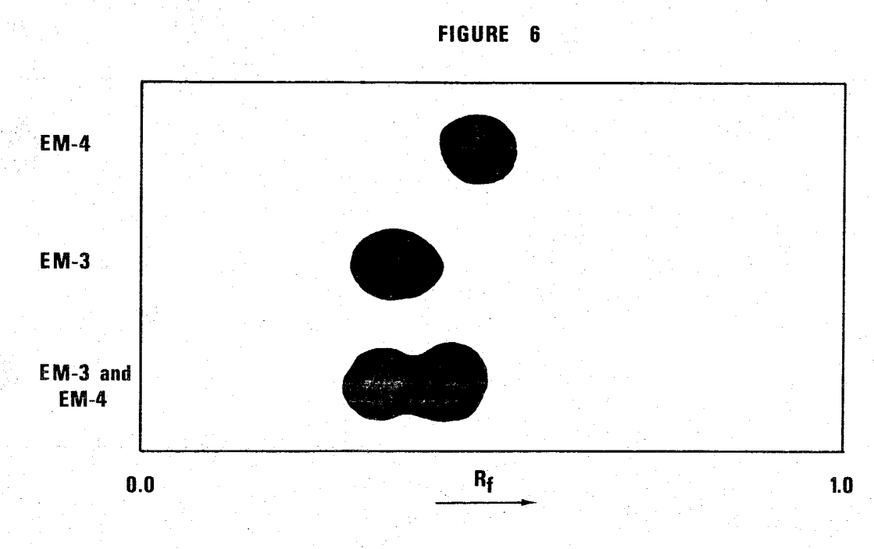
Figure 7:
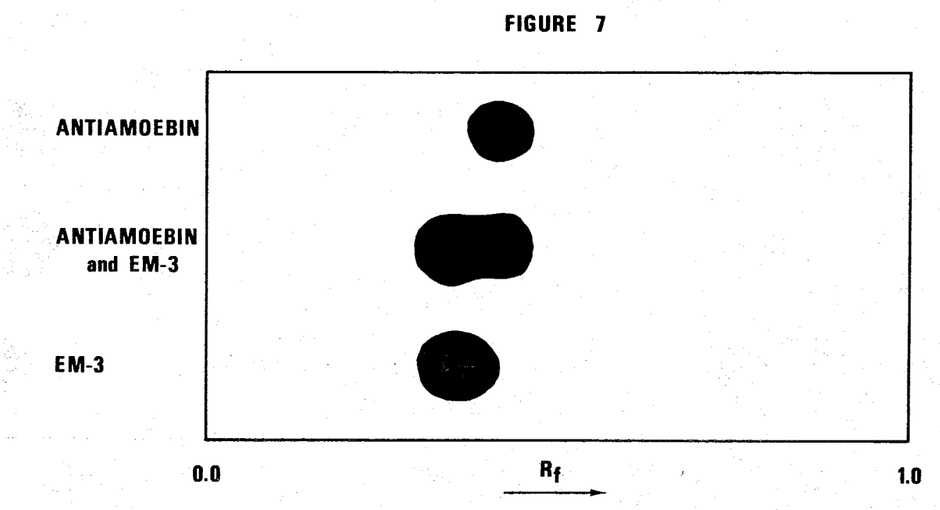

*Requires blood for growth
Note: The prefix "UC" refers to The Upjohn Company culture collection.

tions from both antiamoebin and stilbellin and have been separated from antiamoebin and stilbellin by thin layer chromatography (tlc) and paper chromatography. Drawings of the above comparisons of the antibiotics on thin layer chromatography are disclosed herein as follows:

FIG. 4 — Thin layer chromatographic comparison of antibiotics EM-2 and EM-3,

FIG. 5 — Thin layer chromatographic comparison of antibiotics EM-2 and EM-4,

FIG. 6 — Thin layer chromatographic comparison of antibiotics EM-3 and EM-4, and FIG. 7 — Thin layer chromatographic comparison of antibiotics EM-3 and antiamoebin.

The above thin layer chromatographies were conducted using Eastman's Chromagram silica gel sheets as support and chloroform in methanol (6:1 v/v) as the solvent system. Twenty microliters of antibiotic sample was applied to the sheets. The sheets were developed for approximately two hours, dried, and then applied to Sarcina lutea trays. S. lutea is inoculated into the assay agar (Seed Agar Med. No. 1, BBL, Cockeysville, Md.) of the following composition:

| | |
|---|---|
| Gelysate Peptone | 6.0gm/l |
| Trypticase Peptone | 4.0gm/l |
| Yeast Extract | 3.0gm/l |
| Beef Extract | 1.5gm/l |
| Glucose | 1.0gm/l |
| Agar | 15 gm/l |
| pH | 6.6±0.2 |

The trays are incubated at 28°C. for 18 hours and the zones observed by tlc are recorded as to $R_f$ value.

THE MICROORGANISM

The microorganism used for the production of the antibiotics of the subject invention is a strain of the known microorganism Emericellopsis microspora. One of its strain characteristics is the production of antibiotics EM-2, EM-3 and EM-4 in the presence of propylproline. A subculture of the living organism was deposited and can be obtained from the permanent collection of the Northern Utilization and Research Service, U.S. Department of Agriculture, Peoria, Ill., U.S.A. Its accession number in this repository is NRRL 5648.

The microorganism of this invention was studied and characterized by Alma Dietz of the Upjohn Research Laboratories.

Emericellopsis microspora strain 333 has the macroscopic and microscopic growth characteristics of the known microorganism Emericellopsis microspora WSF-47, ATCC 14645, as described by Backus and Orpurt [Backus, M.P. and P.A. Orpurt. 1961. A new Emercellopsis from Wisconsin with notes on other species. Mycologia 53:64-83.] Emercellopsis microspora strain 333 is distinguishable from Emercellopsis microspora WSF-47 by the fact that Emercellopsis microspora strain 333 requires the presence of propylproline in the fermentation medium to produce the antibiotics of the subject invention.

The new compounds of the invention are produced when the elaborating organism is grown in an aqueous nutrient medium under submerged aerobic conditions in the presence of propylproline. It is to be understood also that for the preparation of limited amounts surface cultures and bottles can be employed. The organism is grown in a nutrient medium containing a carbon source, for example, an assimilable carbohydrate, and a nitrogen source, for example, an assimilable nitrogen compound or proteinaceous material. Preferred carbon sources include glucose, brown sugar, sucrose, glycerol, starch, cornstarch, lactose, dextrin, molasses, and the like. Preferred nitrogen sources include cornsteep liquor, yeast, autolyzed brewer's yeast with milk solids, soybean meal, cottonseed meal, cornmeal, milk solids, pancreatic digest of casein, distillers' solids, animal peptone liquors, meat and bone scraps, and the like. Combinations of these carbon and nitrogen sources can be used advantageously. Trace metals, for example, zinc, magnesium, manganese, cobalt, iron, and the like, need not be added to the fermentation media since tap water and unpurified ingredients are used as components of the medium.

The antibiotics of the subject invention are produced when an effective amount of propylproline, e.g. 4′-trans-n-propyl-L-proline is added to the Emericellopsis microspora strain 333 fermentation. The effective amount of propylproline can be varied from about 1 mg./l. to about 4 gm./l. High levels detract from the economic advantages of the process. It has been found that the effective amount of propylproline will vary with media ingredients employed, and that high antibiotic fermentation titers are produced at levels of about 1 to 2 gm./l. The propylproline can be added to the fermentation, conveniently, at any time after inoculation, or at intervals during the course of the fermentation. The preferred propylproline of the subject invention is 4(R)-propylproline. A mixture of 4(R) and 4(S) propylproline can be used if the mixture contains 50 percent or more of the 4(R) configuration. Propylproline can be prepared as disclosed in pending U.S. application Ser. No. 220,389, filed Jan. 24, 1972.

Production of the compounds of the invention can be effected at any temperature conducive to satisfactory growth of the microorganism, for example, between about 18° and 40° C., and preferably between about 20° and 32° C. Ordinarily, optimum production of the compounds is obtained in about 2 to 10 days. The medium normally remains basic during the fermentation. The final pH is dependent, in part, on the buffers present, if any, and in part on the initial pH of the culture medium.

When growth is carried out in large vessels and tanks, it is preferable to use the vegetative form, rather than the spore form, of the microorganism for inoculation to avoid a pronounced lag in the production of the new compounds and the attendant inefficient utilization of the equipment. Accordingly, it is desirable to produce a vegetative inoculum in a nutrient broth culture by inoculating this broth culture with an aliquot from a soil or a slant culture. When a young, active vegetative inoculum has thus been secured, it is transferred aseptically to large vessels or tanks. The medium in which the vegetative inoculum is produced can be the same as, or different from, that utilized for the production of the new compounds, as long as it is such that a good growth of the microorganism is obtained.

A variety of procedures can be employed in the isolation and purification of the compounds of the subject invention, for example, solvent extraction, partition chromatography, silica gel chromatography, liquid-liquid distribution in a Craig apparatus, absorption on resins, and crystallization from solvents.

In a preferred recovery process, the compounds of the invention are recovered from the culture medium by separation of the mycelia and undissolved solids by conventional means, such as by filtration or centrifugation. The antibiotics are then removed from the filtered or centrifuged broth by resin sorption on a resin comprising a non-ionic macro porous copolymer of styrene crosslinked with divinylbenzene. Suitable resins are Amberlite XAD-1 and XAD-2 disclosed in U.S. Pat. No. 3,515,717. After the resin is washed with water, it is eluted with an organic or aqueous organic solvent in which the sorbed antibiotic is soluble. Ninety-five percent aqueous methanol is the preferred solvent for elution. Fractions from the column are tested for bioactivity on a standard microbiological test using the microorganism Sarcina lutea. Active fractions are subjected to further recovery procedures, for example, solvent extraction. In a preferred process, active fractions from the resin column are mixed with acetone and the remaining filtrate is concentrated to dryness. The residue obtained is dissolved in methanol and this solution is mixed with ether to give a precipitate containing the antibiotics of the subject invention. Separation of the antibiotics is achieved by silica gel chromatography using silica gel (Merck-Darmstadt Art 7734) and the solvent system chloroform-methanol (6:1 v/v).

Some antibiotic activity is also present in the spent beer from the resin column, described above. This antibiotic activity is recovered from the spent beer and resolved into the individual antibiotics by butanol extraction of the spent beer and silica gel chromatography of the butanol extracts.

Another source of antibiotics from the fermentation disclosed herein is the filter cake from the filtration operation. In a preferred process, the filter cake is triturated with methanol and the methanol extracts are then subjected to silica gel chromatography, as described above, to give the individual antibiotics in their pure form.

The antibiotics of the invention are active against *Staphylococcus aureus* and *Streptococcus faecalis* and can be used to disinfect washed and stacked food utensils contaminated with these bacteria; they can also be used as disinfectants on various dental and medical equipment contaminated with *Staphylococcus aureus*. Further, since the antibiotics of the invention are active against *Streptococcus hemolyticus*, they can be used to disinfect instruments, utensils, or surfaces, where the inactivation of this microorganism is desirable.

It is to be understood that the microbiological process disclosed herein, though described in detail with reference to the strain of *Emericellopsis microspora* strain 333, NRRL 5648, is not limited to this particular microorganism or to microorganisms fully described by the cultural characteristics disclosed herein. It is intended that this invention also include other strains or mutants of the said microorganism which can be produced by procedures well known in the art, for example, by subjecting the novel microorganism to x-ray or ultra-violet radiation, nitrogen mustard, phage exposure, and the like.

Hereinafter are described non-limiting examples of the process and products of the subject invention. All percentages are by weight and all solvent mixture proportions are by volume unless otherwise noted.

EXAMPLE 1

Part A. Fermentation

A soil stock of *Emericellopsis microspora* strain 333 NRRL 5648, is used to inoculate a series of 500-ml. Erlenmeyer flasks, each containing 100 ml. of sterile seed medium consisting of the following ingredients:

| | |
|---|---|
| Glucose monohydrate | 10 gm/l |
| Bacto Peptone (Difco) | 10 gm/l |
| Bacto Yeast Extract (Difco) | 2.5gm/l |
| Deionized water, pH is unadjusted | Balance |

The flasks are grown for 4 days at 28° C. on a Gump rotary shaker operating at 250 r.p.m.

Seed inoculum, described above, is used to inoculate a series of 500-ml. Erlenmeyer flasks each containing 100 ml. of sterile fermentation medium. The inoculation rate is 5 ml. of seed inoculum per 100 ml. of fermentation medium.

The fermentation medium consists of the following ingredients:

| | |
|---|---|
| Glucose monohydrate | 45gm/l |
| Buffalo starch* | 40gm/l |
| Blackstrap molasses | 20gm/l |
| Calcium carbonate | 8gm/l |
| Potassium sulfate | 2gm/l |
| Peptone (Wilson's s.p.), granular** | 25gm/l |
| Tap water q.s. | Balance |

*A corn starch supplied by the Corn Products Corporation International.
**Supplied by the Wilson Pharmaceutical and Chemical Corporation, Chicago, Illinois.

The pH of the fermentation medium is adjusted to 7.2 with an aqueous solution of sodium hydroxide before sterilization. Three drops of Ucon (a synthetic defoamer supplied by Union Carbide, N.Y., N.Y.) is added per flask. The inoculated fermentation flasks are incubated for 24 hours at a temperature of 28° C. on a Gump rotary shaker operating at 250 r.p.m. After 24 hours, propylproline is added to the flasks (50 mg. per 100 ml. of medium). The flasks are then reincubated on the Gump rotary shaker. Harvest is usually after 192 hours of fermentation.

The total antibiotic titer of the fermentation beer can be monitored by use of a disc plate assay using the microorganism *S. lutea*, described above.

Part B. Recovery

Whole fermentation beer (10 liters), harvested 168 hours after the addition of propylproline, obtained as described above, is filtered using diatomaceous earth as a filter aid. The filter cake is washed with 1 liter of water. Clear beer and the water wash are combined (8 liters) and kept as preparation 101.1. The filter cake is triturated with 2 liters of absolute methanol to give a methanolic extract and kept as preparation 101.2.

Preparation 101.1 is passed over a chromatography column containing 500 ml. of Amberlite XAD-2. The spent beer is collected as one fraction and designated as preparation 101.3. The column is then washed with 2 liters of water. The aqueous wash is kept as preparation 101.4. The column is eluted with 95 percent aqueous methanol. Fractions of 20 ml. are collected and selected fractions are tested for bioactivity against *S. lutea*. The results of these tests, as well as tests on the previous preparations, are as follows:

| Preparation | | S. lutea zone (mm) |
|---|---|---|
| 101.1 | Clear beer | 21 |
| 101.2 | Methanolic extract | 12 |
| 101.3 | Spent beer from XAD-2 chromatography | 18 |
| 101.4 | Aqueous wash from XAD-2 chromatography | 9 |

Fractions eluted with 95 percent methanol:

| Fraction No. | S. lutea zone (mm) |
|---|---|
| 5 | 0 |
| 10 | 0 |
| 12 | traces |
| 14 | 13 |
| 16 | 18 |
| 18 | 17 |
| 20 | 17 |
| 25 | 0 |
| 30 | 0 |
| 35 | 0 |
| . | . |
| 70 | 0 |

Fractions 14–23 are combined and concentrated to dryness to give preparation 102.1. This preparation is processed further in Part C (4).

Part C. Purification

1. Isolation of the Antibiotic Activities Present in Spent Beer by Extraction with Butanol Preparation 101.3 (8 liters), obtained as described in Part B, is extracted twice with 2.5 liters of 1-butanol each time. The butanol extracts are combined and concentrated to dryness to give preparation 141.3.

2. Isolation of the Antibiotics Present in the Butanolic Extract of Spent Beer by Silica Gel Chromatography Preparation 141.3, obtained as described in Part C (1), is triturated with 250 ml. of acetone. The resulting insoluble material is isolated by filtration and dried; yield, 6.4 gm. of preparation 141.4. This preparation is found by tlc to be a mixture of antibiotics EM-3 and EM-4 and is purified by silica gel chromatography as described below.

The chromatography column is prepared from 1 kg. of silica gel packed in the solvent system consisting of chloroform-methanol (6:1 v/v). The starting material for the chromatography, preparation 141.4 (6 gm.), is dissolved in 300 ml. of methanol. This solution is mixed with 600 ml. of chloroform and 50 gm. of silica gel. The mixture is concentrated to dryness and the dry powder obtained is added on the top of the column. The column is eluted with the above solvent system. Fractions (20 ml.) are collected and tested for bioactivity against *S. lutea*. Selected fractions are analyzed for antibiotic content by tlc chromatography.

Fractions 1–269 are found to be inactive.

Fractions 270–500 are found to contain antibiotic EM-4 only. These fractions are combined and the solution is concentrated to dryness to give 1.2 gm. of colorless crystalline material designated preparation 57.1. This preparation is recrystallized from 36 ml. of 50 percent aqueous methanol; yield, 900 mg. of colorless crystalline needles of antibiotic EM-4.

Fractions 501–600 also contain the antibiotic EM-4 only. These fractions are combined and the slightly colored solution is concentrated to dryness to give 210 gm. of preparation 56.2.

Fractions 601–1165 contain both antibiotics EM-3 and EM-4. These fractions are combined and the solution is concentrated to dryness to give preparations designated 56.3 and 56.4. Antibiotic EM-3 is obtained from these preparations and others as described in Part C (7).

3. Isolation of the Antibiotics Present in the Methanolic Extract of the Filter Cake Preparation 101.2 (2 liters), obtained as described in Part B, is concentrated to dryness. The resulting residue is triturated with 1 liter of absolute methanol. The filtrate is mixed with 5 liters of acetone. The resulting precipitate is kept as preparation 114.2 (5.7 gm.). The new filtrate is mixed with 20 liters of ether. The new precipitate formed is isolated by filtration and dried and kept as preparation 114.3 (7.4 gm.). Preparation 114.3, as shown by tlc, contains antibiotics EM-2 (small amounts), EM-3 and Em-4. Separation of these antibiotics is achieved by silica gel chromatography.

The silica gel chromatography column is prepared from 1.8 kg. of silica gel packed in the solvent system consisting of chloroform-methanol (6:1 v/v). The starting material, preparation 114.3 (ca 7 gm.), obtained as described above, is dissolved in the above solvent system (500 ml.) and this solution is mixed with 100 gm. of silica gel. The mixture is concentrated to dryness and the obtained powder is added on the top of the column. The column is eluted with the above solvent system. A total of 2,100 fractions (20 ml. each) are collected. Then 15 fractions of 2 liters each are collected by elution of the column with the same solvent. Selected fractions are analyzed for bioactivity against *S. lutea* and for antibiotic content by tlc.

Fractions 1–939 are found inactive and are discarded.

Fractions 940–1200 contain antibiotic EM-4 only. They are concentrated to dryness; yield, 1.62 gm. of colorless crystalline material designated preparation 31.1. This material is recrystallized from 48 ml. of 50 percent aqueous methanol to give 1.4 gm. of colorless needles designated preparation 107.1. This material is found by tlc to be antibiotic EM-4.

Fractions 1201–1250 also contain antibiotic EM-4. These fractions are concentrated to dryness to give preparation 31.2 (360 mg.).

Fractions 1351–1950 contain both antibiotics EM-3 and EM-4. These fractions are combined and the solution is concentrated to dryness and designated preparations 31.3 and 31.4 which are treated as described in Part C (7).

Fractions (2 liters each) 6–13 contain antibiotic EM-2. These fractions are combined and concentrated to dryness to give preparation 31.5 (320 mg.). This preparation is processed further as disclosed in Part C (6).

4. Isolation of the Antibiotics Present in the Amberlite XAD-2 Eluates by Silica Gel Chromatography Preparation 102.1 (160 ml. of 95 percent methanolic eluates from the Amberlite XAD-2 chromatography described above in Part B) is mixed with 1.6 liters of acetone. The resulting precipitated material is separated by filtration and discarded. The filtrate is concentrated to dryness to give a residue which is dissolved in 50 ml. of methanol, and this solution is mixed with 2 liters of ether. The resulting precipitated material is isolated by filtration, dried, and kept as preparation 116.1 (2.1 gm.). This preparation, as determined by tlc, contains mainly EM-4 and EM-3. Separation of these antibiotic activities is achieved by silica gel chromatography as described below.

The chromatography column is prepared from 200 gm. of silica gel (Merck-Darmstadt Art 7734) packed in chloroformmethanol (6:1 v/v). Preparation 116.1 (2.1 gm.) is dissolved in 20 ml. of methanol and 100 ml. of chloroform. This solution is mixed with 10 gm. of silica gel and the mixture is concentrated to dryness. The dry powder obtained is added on the top of the column. The column is eluted with the above solvent system. Fractions of 20 ml. are collected and analyzed by testing against *S. lutea* after ten-fold concentration. Results follow:

| Fraction No. | Zone (mm) | Fraction No. | Zone (mm) |
| --- | --- | --- | --- |
| 5 | 0 | 230 | 16 |
| 10 | 0 | 240 | 17.5 |
| 15 | 0 | 250 | 16 |
| 20 | 0 | 260 | 15 |
| 25 | 0 | 270 | 15 |
| 30 | 0 | 280 | 14 |
| 35 | 0 | 290 | 13.5 |
| 40 | 0 | 300 | 13 |
| 45 | 0 | 310 | 12.5 |
| 50 | 0 | 320 | 12.5 |
| 55 | 0 | 330 | 10 |
| 60 | 0 | 340 | 9 |
| 65 | 0 | 350 | traces |
| 70 | 0 | 360 | do. |
| 75 | 0 | 370 | do. |
| 80 | 0 | 380 | do. |
| 85 | 0 | 390 | do. |
| 90 | 0 | 400 | do. |
| 95 | traces | 410 | do. |
| 100 | 14 | 420 | do. |
| 105 | 16.5 | 430 | do. |
| 110 | 17.5 | 440 | do. |
| 115 | 17.5 | 450 | 8 |
| 120 | 17.5 | 460 | 11 |
| 125 | 16.5 | 470 | 11 |
| 130 | 17 | 480 | 11 |
| 135 | 17 | 490 | 11 |
| 140 | 17 | 500 | 11 |
| 145 | 16.5 | 510 | 11 |
| 150 | 16 | 520 | 11 |
| | | 530 | 10 |
| 155—New *S.* | 20.5 | 540 | 10 |
| 160 *lutea* tray | 20.5 | 550 | 10 |
| 165 was used | 20.5 | 560 | 10 |

| Fraction No. | Zone(mm) | Fraction No. | Zone(mm) |
|---|---|---|---|
| 170 | 20.5 | 570 | 9 |
| 175 | 19 | 580 | 9 |
| 180 | 20 | 590 | 8 |
| 185 | 19.5 | 600 | 0 |
| 190 | 19.5 | 610 | 0 |
| 195 | 19.5 | 620 | 0 |
| 200 | 19.5 | 630 | 0 |
| 210 | 19 | 640 | 0 |
| 220 | 18 | 650 | 0 |

Fractions 101–175 are found by tlc to contain antibiotic EM-4. These fractions are combined and the solution is concentrated to dryness. The resulting crystalline residue is triturated with 50 ml. of acetone. The remaining crystals are isolated by filtration and dried; yield, 620 mg. of antibiotic EM-4 preparation designated 126.1. This preparation is processed further as disclosed in Part C (5). The filtrate, ca 60 ml., is mixed with 600 ml. of ether. The precipitate formed is collected and designated preparation 126.2 (50 mg). The new filtrate is concentrated to dryness and the resulting residue is dissolved in 1 ml. of methanol and 1 ml. of acetone. This solution is mixed with 40 ml. of ether and 50 ml. of Skellysolve B (isomeric hexanes). A new precipitate is collected and designated as preparation 126.3 (20 mg.). The remaining filtrate is again concentrated to dryness to give preparation 126.4.

Fractions 176–300, from the above silica gel chromatography column, are found by tlc to contain both antibiotics EM-3 and EM-4. These fractions are combined and the solution is concentrated to dryness to give preparation 137.1, which is trated as described in Part C (7).

Fractions 450–590, from the above-described silica gel chromatography column, are found by tlc to contain antibiotic EM-2. These fractions are combined and concentrated to dryness to give a residue which is dissolved in 5 ml. of methanol, and this solution is mixed with 200 ml. of ether. The resulting precipitated material is isolated by filtration; yield, 260 mg. of antibiotic EM-2 preparation designated as 137.2. This preparation is processed further as disclosed in Part C (6). The remaining filtrate is concentrated to dryness to give preparation 137.3. The above obtained preparations are tested against several microorganisms on a standard disc-plate assay (12.5 mm disc) using standard nutrient media. All preparations are tested at concentrations of 10 mg./ml. except preparations 126.4 and 137.3. These two preparations are dissolved in 5 ml. of absolute methanol and this solution is tested. The results of the tests are as follows:

Preparation 126.2 and 126.3 are discarded.

5. Crystallization of Antibiotic EM-4

Preparation 126.1 is found to contain antibiotic EM-4. This preparation (500 mg.) is recrystallized from 15 ml. of 5 percent aqueous methanol. The colorless needles obtained are isolated by filtration and dried; yield, 410 mg. of crystalline antibiotic EM-4.

6. Crystallization of Antibiotic EM-2

Preparations 137.2 and 31.5, obtained as described above in Part C (4) and Part C (3), respectively, are combined. The combined preparation (ca 500 mg.) is dissolved in 10 ml. of absolute methanol under heating on a steam bath. The methanolic solution is clarified by filtration and mixed with water to a final volume of 45 ml. Antibiotic EM-2, crystallized in colorless needles, is isolated by filtration and dried; yield, 180 mg.

7. Isolation and Crystallization of Antibiotic EM-3

Preparations 137.1 (Part C (4)), 56.3, 56.4 (Part C (2)), 31.3, and 31.4 (Part C (3)), obtained as described above, are found by tlc to be a mixture of both antibiotics EM-4 and EM-3. These preparations are combined (2.0 gm.) and subjected to silica gel chromatography in order to isolate antibiotic EM-3. The silica gel chromatography column is prepared from 1 kg. of silica gel (Merck-Darmstadt Art 7734) packed in the solvent system consisting of chloroform-methanol (6:1 v/v). The starting material containing EM-4 and EM-3, described above, is in 200 ml. of the solvent system. The solution is mixed with 20 gm. of silica gel and this mixture is concentrated to dryness. The powder obtained is added on the top of the column. The column is eluted with the above solvent system. Fractions (20 ml. each) are tested for bioactivity against *Sarcina lutea* and for antibiotic composition by tlc. Results are as follows:

| Fraction No. | Zone size (mm) | Fraction No. | Zone size (mm) |
|---|---|---|---|
| 10 | 0 | 510 | 20 |
| 20 | 0 | 520 | 21 |
| . | . | 530 | 20 |
| . | . | 540 | 20 |
| . | . | 550 | 20 |
| 450 | 0 | 560 | 20 |
| 460 | traces | 570 | 21 |
| 470 | 17 | 580 | 21 |
| 480 | 20 | 590 | 20 |
| 490 | 21 | 600 | 20 |
| 500 | 21 | 610 | 19 |
| 620 | 19 | 770 | 15 |
| 630 | 19 | 780 | 14 |
| 640 | 19 | 790 | 14 |
| 650 | 19 | 800 | 13 |

| | Prep. No. and Zone (mm) | | | | | | |
|---|---|---|---|---|---|---|---|
| Microorganism | 126.1 | 126.2 | 126.3 | 126.4 | 137.1 | 137.2 | 137.3 |
| S. lutea | 19 | 0 | 0 | 14(h) | 18 | 16.5 | traces |
| S. lutea-124 | 22 | 0 | 0 | 15(h) | 22 | 19 | traces |
| S. aureus | 21 | 0 | 0 | 17.5 | 18 | 15 | 11(h) |
| B. subtilis | 20 | 0 | 0 | 20.5 | 18.5 | 16 | 11(h) |
| B. cereus | 18.5 | 0 | 0 | 9 | 17.5 | 16.5 | 0 |
| M. avium | 23 | 11 | traces | 12(h) | — | | |
| S. gallinarum | 10 | 0 | 0 | 25.5 | 9 | 13 | 21 |
| S. schottmuelleri | — | — | — | | traces | 10 | 23 |
| P. vulgaris | 11.5 | 0 | 0 | 30 | 11 | 15 | 26 |
| E. coli | traces | 0 | 0 | 26 | traces | 9 | 22 |
| K. pneumoniae | 11 | 0 | 0 | 23 | traces | 9 | 20 |

Note: (h) indicates a halo zone.
0 = no zone outside of disc.

| Fraction No. | Zone size (mm) | Fraction No. | Zone size (mm) |
|---|---|---|---|
| 660 | 18 | 810 | 15 |
| 670 | 17 | 820 | 15.5 |
| 680 | 17 | 830 | 15 |
| 690 | 17 | 840 | 13.5 |
| 700 | 17 | 850 | 13 |
| 710 | 17 | 860 | 13 |
| 720 | 16.5 | 870 | 12.5 |
| 730 | 16.5 | 880 | 10 |
| 740 | 16 | 890 | 11.5 |
| 750 | 16 | 900 | 10.5 |
| 760 | 15 | | |

Fractions 470–560 contain antibiotic EM-4 only. They are combined and concentrated to dryness to give preparation 85.1.

Fractions 570–610 contain EM-4 and traces of EM-3. They are also combined and concentrated to dryness to give preparation 85.2.

Fractions 630–900 contain antibiotic EM-3 only. These fractions are combined and concentrated to dryness to give 650 gm. of a preparation of crystalline antibiotic EM-3. This crystalline preparation is dissolved in 10 ml. of methanol under heating on a steam bath. Water (35 ml.) is added and the mixture is allowed to stand at room temperature for 4 hours. The resulting precipitated crystalline material, colorless needles, is isolated by filtration and dried; yield, 250 mg. of crystalline antibiotic EM-3.

We claim:

1. Antibiotic EM-2, which is active against various gram-positive bacteria, and which in its essentially pure crystalline form
   a. has the following elemental analyses: C, 57.47; H, 7.70; N, 12.99; O, 21,87 (by difference);
   b. has a melting point of 261.4° C.;
   c. has a specific rotation $[\alpha]_D^{25} = +5°$ (c, 1.0, methanol);
   d. has the following ultraviolet absorption spectrum:

In methanol:

| λ max (mμ) | a |
   |---|---|
   | 216(sh) | 24.02 |
   | 269(sl.sh) | 2.67 |
   | 273 | 2.81 |
   | 281 | 2.97 |
   | 289 | 2.62; | e. is soluble in dimethylformamide, dimethylsulfoxide and lower alcohols; is less soluble in chlorinated hydrocarbon solvents and ethyl acetate; is rather insoluble in acetone and ether; and is completely insoluble in saturated hydrocarbon solvents; and
   f. has a characteristic infrared absorption spectrum when suspended in mineral oil mull as shown in FIG. 1 of the drawing.

2. Antibiotic EM-3, which is active against various gram-positive bacteria, and which in its essentially pure crystalline form
   a. has the following elemental analyses: C, 58.46; H, 7.78; N, 13.27; O, 21.49 (by difference);
   b. has a melting point of 256.9° C.;
   c. has a specific rotation $[\alpha]_D^{25} = +12°$ (c, 1.0, methanol);
   d. has the following ultraviolet absorption spectrum;

In methanol:

| λ max (mμ) | a |
   |---|---|
   | 243(sl.sh) | 0.48 |
   | 253 | 0.43 |
   | 257 | 0.46 |
   | 261(sh) | 0.43 |
   | 264 | 0.44 |
   | 267 | 0.41; | e. is soluble in dimethylformamide, dimethylsulfoxide and lower alcohols; is less soluble in chlorinated hydrocarbon solvents and ethyl acetate; is rather insoluble in acetone and ether; and is completely insoluble in saturated hydrocarbon solvents; and
   f. has a characteristic infrared absorption spectrum when suspended in mineral oil mull as shown in FIG. 2 of the drawing.

3. Antibiotic EM-4, which is active against various gram-positive bacteria, and which in its essentially pure crystalline form
   a. has the following elemental analyses: C, 57.26; H, 7.45; N, 14.22; O, 21.08 (by difference;
   b. has a melting point of 239.8° C.;
   c. has a specific rotation $[\alpha]_D^{25} = +13.5°$ (c, 1.0, methanol);
   d. has the following ultraviolet absorption spectrum:

In methanol:

| λ max (mμ) | a |
   |---|---|
   | 247(sh) | 0.26 |
   | 252 | 0.24 |
   | 257 | 0.26 |
   | 261(sh) | — |
   | 264 | 0.26 |
   | 267 | 0.15; | e. is soluble in dimethyformamide, dimethylsulfoxide and lower alcohols; is less soluble in chlorinated hydrocarbon solvents and ethyl acetate; is rather insoluble in acetone and ether; and is completely insoluble in saturated hydrocarbon solvents; and
   f. has a characteristic infrared absorption spectrum when suspended in mineral oil mull as shown in FIG. 3 of the drawing.

4. A process for preparing the antibiotics EM-2, EM-3, and EM-4, which comprises cultivating *Emericellopsis microspora* strain 333 having the identifying characteristics of NRRL 5648, in an aqueous nutrient medium under aerobic conditions, to which has been added an effective amount ranging from about 1 mg./l. to about 4 gm./l. of propylproline, until substantial antibiotic activity is imparted to said medium by the production of antibiotics EM-2, EM-3 and EM-4.

5. A process, according to claim 4, wherein said aqueous nutrient medium contains a source of assimilable carbohydrate and assimilable nitrogen.

6. A process, according to claim 4, wherein an effective amount of 4(R)-propyl-L-proline is added to the fermentation medium.

7. A process, according to claim 6, wherein 4(R)-propyl-L-proline is added to the fermentation medium in the amount of 5 mg./10 ml. of said medium.

8. A process for preparing the antibiotics EM-2, EM-3 and EM-4, which comprises cultivating Emericellopsis microspora strain 333 having the identifying characteristics of NRRL 5648, in an aqueous nutrient medium under aerobic conditions, to which has been added an effective amount ranging from about 1 mg./l. to about 4 gm./l. of propylproline, until substantial antibiotic activity is imparted to said medium by the production of antibiotics EM-2, EM-3 and EM-4, and isolating said antibiotics EM-2, EM-3 and EM-4 as a mixture from the fermentation broth.

9. A process, wherein a fermentation mixture of antibiotics EM-2, EM-3 and EM-4, as described in claim 8, are separated into their individual entities by silica gel chromatography.

* * * * *